United States Patent [19]

Dobbins

[11] 4,261,128
[45] Apr. 14, 1981

[54] FISHING ROD HOLDER

[76] Inventor: Albert L. Dobbins, 4243 Monroe Ave., Kansas City, Mo. 64130

[21] Appl. No.: 973,235

[22] Filed: Dec. 22, 1978

[51] Int. Cl.³ ...................... A01K 87/00; A01K 97/10
[52] U.S. Cl. ........................................ 43/21.2; 43/23; 248/514
[58] Field of Search ................... 43/21.2, 23; 248/514, 248/359

[56]  References Cited
U.S. PATENT DOCUMENTS

| 1,092,548 | 4/1914 | Weber | 43/21.2 |
|---|---|---|---|
| 1,700,876 | 2/1929 | Blitz | 248/359 |
| 1,987,842 | 1/1935 | Sampson | 43/21.2 |
| 2,621,877 | 12/1952 | Grigsby | 43/21.2 |
| 2,665,866 | 1/1954 | Goldinger | 43/21.2 |
| 2,681,779 | 6/1954 | Veschio | 248/514 |
| 3,523,666 | 8/1970 | Bloodsworth | 248/514 |
| 3,906,653 | 9/1975 | Williams | 43/21.2 |

Primary Examiner—Nicholas P. Godici
Attorney, Agent, or Firm—Michael E. Zall

[57] ABSTRACT

A fishing rod holder is provided comprised of a support member having a lower end adapted to be driven into a supporting surface, e.g. sand on a beach. The upper end of the support member is adapted to be pivotally secured to a fishing rod. The fishing rod holder is further comprised of a variable angle retaining means attached to the support member. The variable angle retaining means functions to vary and retain a support angle between the fishing rod and support member and enables the support member to freely close upon the handle of the fishing rod.

3 Claims, 9 Drawing Figures

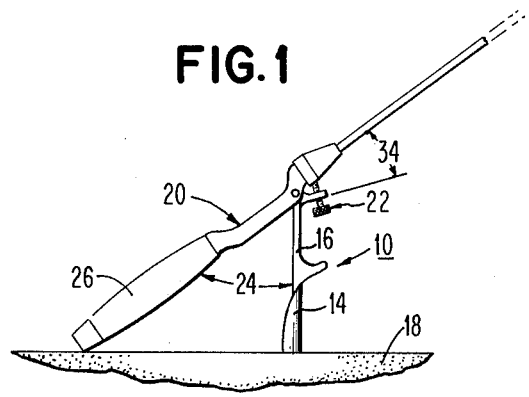
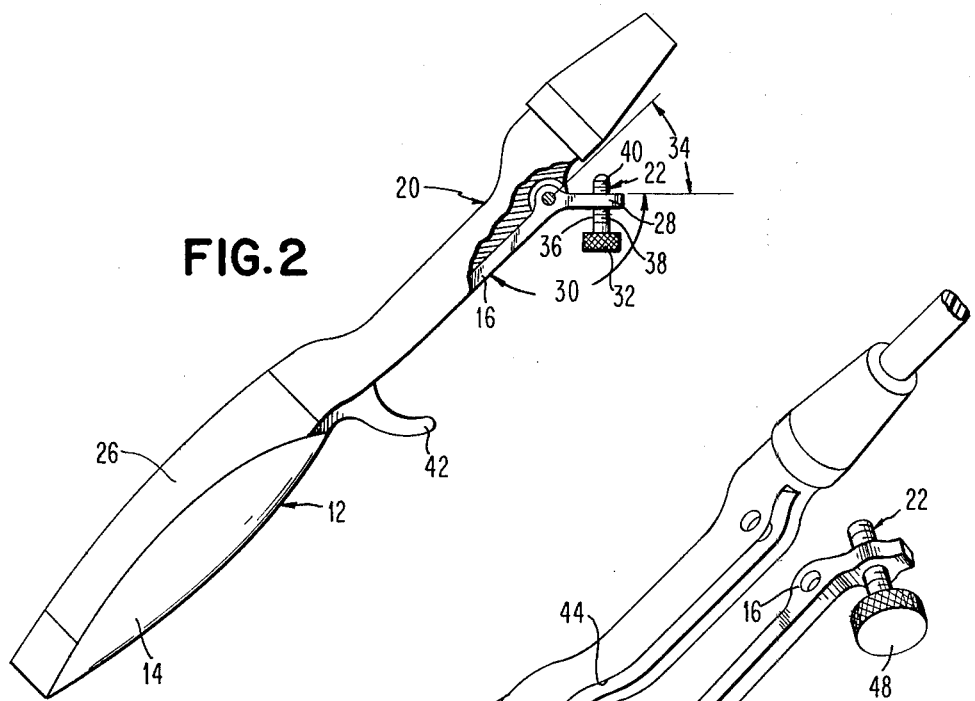
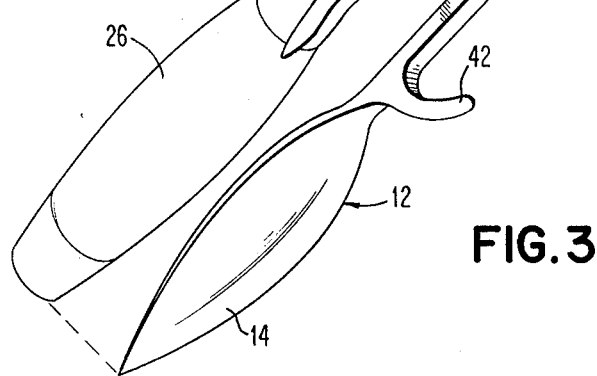

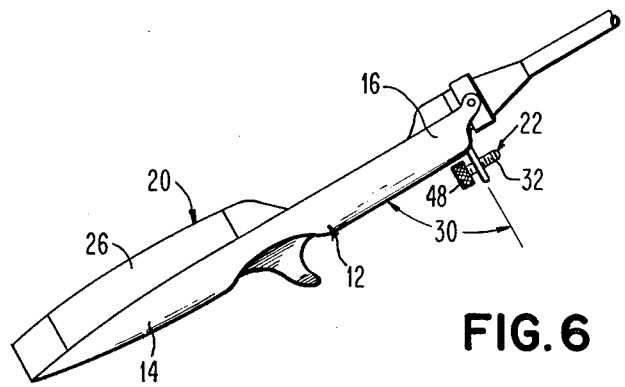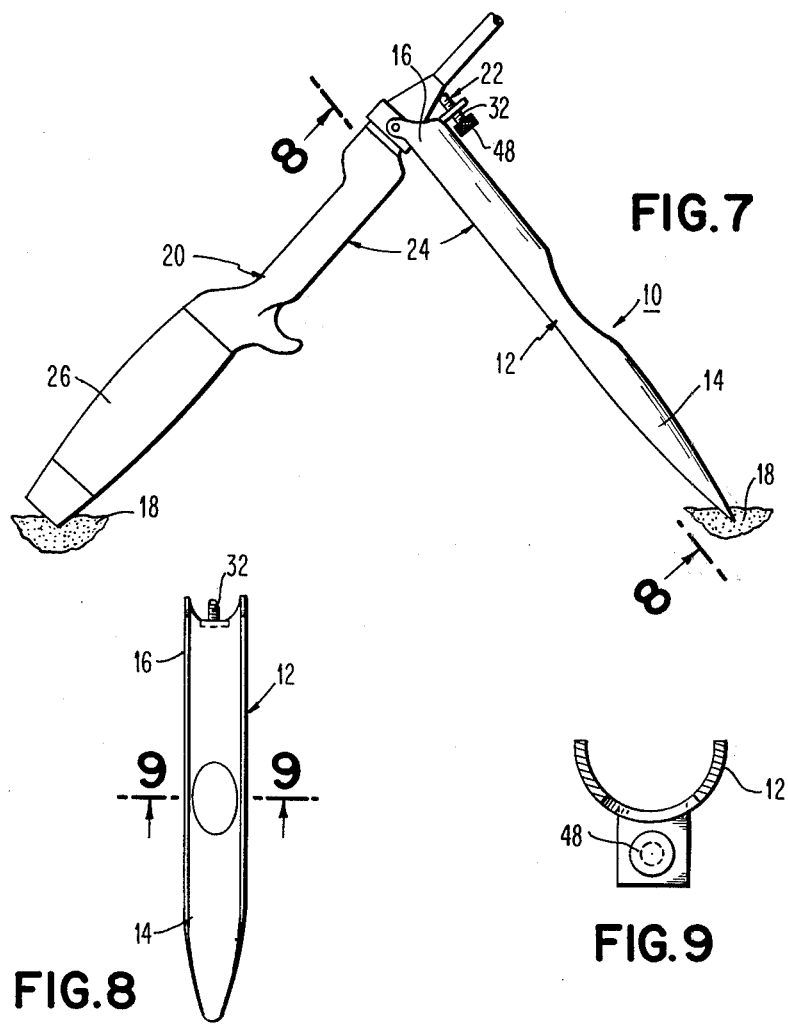

4,261,128

FISHING ROD HOLDER

BACKGROUND OF THE INVENTION

1. Field of the Invention

This invention relates to improvements in surf fishing equipment and more particularly to a device adapted to permit a fishing rod to be maintained in a predetermined position in a supporting surface, e.g. sand on the beach, after the bait has been cast into the surf. Such devices are generally known as sand spikes or fishing rod holders, and by their use the fisherman may leave a rod unattended and fish a plurality of rods at the same time. This invention additionally relates to a new and improved fishing rod holder for holding a fishing rod in an elevated position and at a support angle which can be retained and may be varied.

2. Prior Art.

Various fishing rod holders have been used by anglers. These fishing rod holders support a rod and reel for fishing while the rod is left unattended. These holders enable the angler to simultaneously vish with a plurality of rods without the burden of constantly attending to the support of each rod and reel. Many holders have been used for this purpose such as those shown in U.S. Pat. Nos. 1,092,548; 2,526,981; 2,539,080; 3,115,722; 3,159,939; 3,834,057; 3,906,653 and 3,956,846.

None of the aforementioned references teach or suggest a fishing rod holder capable of retaining a specific support angle which may be varied while simultaneously enabling the support member of the fishing rod holder to quickly and freely close upon the handle of the fishing rod for example when a "strike" is obtained.

SUMMARY OF THE INVENTION

A fishing rod holder is provided comprising:
a support member having a lower end adapted to be driven into a supporting surface, and an upper end adapted to be pivotally secured to a fishing rod; and
a variable angle retaining means attached to the support member for varying and retaining a support angle between the fishing rod and support member and enabling the support member to freely close upon the handle of the fishing rod.

The advantages of the present invention will be readily appreciated by those of ordinary skill in the art by reference to the following detailed description when considered in connection with the accompanying drawings.

BRIEF DESCRIPTION OF THE DRAWINGS

FIG. 1 is a side elevation view of a first embodiment of the fishing rod holder of the present invention attached to a fishing rod assembly and in use while fishing;

FIG. 2 is a side elevation view of the embodiment of the fishing rod holder depicted in FIG. 1 in a closed position for fishing by hand or transporting the fishing rod;

FIG. 3 is an exploded perspective view of the embodiment of fishing rod holder depicted in FIG. 1 and FIG. 2;

FIG. 6 is a side elevation view of a third embodiment of the fishing rod holder of the present invention attached to a fishing rod assembly in a closed position for fishing by hand or transporting the fishing rod;

FIG. 7 is a side elevation view of the embodiment of the fishing rod holder depicted in FIG. 6 in use while fishing;

FIG. 8 is a view of the support member of the fishing rod holder taken along lines 8—8 of FIG. 7; and FIG. 9 is a sectional view taken along 9—9 of FIG. 8.

DESCRIPTION OF THE PREFERRED EMBODIMENTS

Figure 4:
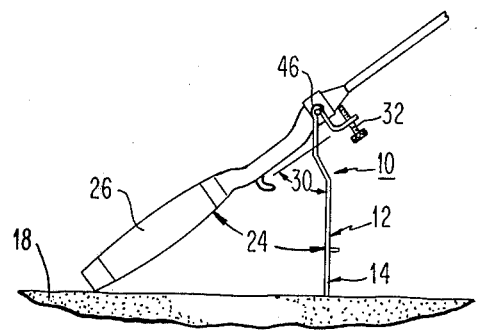
FIG. 4 is a side elevation view of a second embodiment of the fishing rod holder of the present invention attached to a fishing rod assembly and in use while fishing.

Referring now the the drawings wherein like numerals designate like parts throughout the various views, FIGS. 1 through 3; 4 and 5; and 6 through 9; depict three preferred embodiments of this invention. Broadly, all embodiments of the fishing rod holder generally designated (10) are comprised of a support member (12) having a lower end (14) and and upper end (16). The lower end (14) is adapted to be driven into a supporting surface (19), such as the sand on beach, a crevice between rocks, etc. The upper end (16) is adapted to be pivotally secured to a fishing rod (20).

A variable angle retaining means (22) is attached to the support member (12). The variable angle retaining means (22) functions to vary and retain a support angle (24) between the fishing rod (20) and support member (12) and enable the support member (12) to freely close upon the handle (26) of the fishing rod (20).

One of the main benefits in utilizing this invention is that the fishing rod holder (10) can be rapidly and freely closed upon the handle (26) of the fishing rod (20) when, for example there is a strike on the fishing line or when it is desired to quickly close up and pack away the fishing rod holder (10).

On all the embodiments depicted in FIGS. 1-9, the variable angle retaining means (22) consists of a bearing member (28) projecting at an angle (30) generally obtuse, from the support member (12). A variable spacer means (32) is attached to the bearing member (28) for varying and retaining the angle and/or spacing (34) between the bearing member (28) and the fishing rod (20) thereby varying and retaining the support angle (24). Preferably the variable spacer means (32) is a threaded member (36), one end (38) of which is threadably attached to the bearing member (28) and the other end (40) of which can be brought to bear upon a surface of the fishing rod (20). Thus one can vary and retain the support angle (24) by merely turning the threaded member (36).

Optionally, the upper end (16) of the supportmember (12) is detachably secured to the fishing rod (20). This is depicted in, for example, FIG. 5. This invention however, contemplates any means of securing the upper end (16) of the support member (12) to the fishing rod (20) as long as the support member (12) can freely pivot about the upper end (16).

FIGS. 1 through 3 depict a first embodiment of the fishing rod holder (10). In this embodiment the support member (12) is shaped to conform to the curvature of the handle (26) of the fishing rod (20) when the support member (12) is closed upon the handle (26). This shape will generally be spoon shaped and grips the supporting surface (18) securely, The support member (12) additionally has a finger grip (42) attached thereto. A portion of the support member (12) is shaped in such a manner so as to conform to an elongated enclosure (44)

within the fishing rod (20). Thus, the fishing rod holder (10) when in the closed position provides a smoothly contoured handle (26) to the fishing rod (20).

In the embodiment depicted in FIGS. 1 through 3 the fishing rod holder (10) is pivotally attached to the fishing rod (20) by a pivot member (46) which passes through one side of the elongated enclosure (44) through the support member (12) and then through the other side of the elongated enclosure (44). The threaded member (36) has a knurled head (48) which allows for easy adjustment of the angle and/or spacing (34) between the bearing member (28) and the fishing rod (20).

Figure 5:
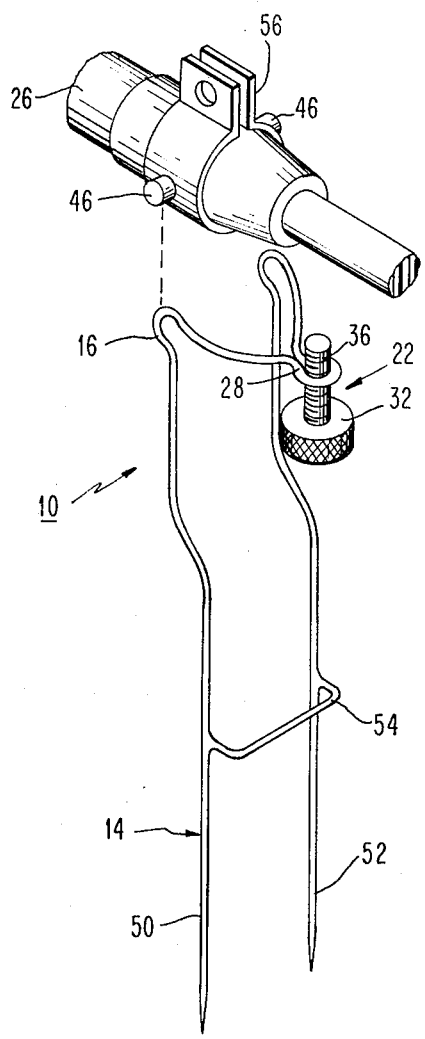
FIG. 5 is an exploded perspecive view of the embodiment of the fishing rod holder depicted in FIG. 4.

A second embodiment of this invention is depicted in FIGS. 4 and 5. In this embodiment the support member (12) and the variable angle retaining means (22) are constructed of substantially a one piece rod-like member. A fishing rod holder (10) constructed in such a manner provides a support member (12) which has two substantially parallel elongated support legs (50 and 52). Optionally, a web (54), which may be an elongated member, may connect the support legs (50 and 52) so that they do not spread apart or collapse with usage. Such web (54) additionally maintains the support member (12) against the fishing rod handle (26) when the fishing rod holder (10) is closed. The upper end (16) of the support member (12) is pivotally secured to the fishing rod (20) by a collar (56) which is mounted on the fishing rod (20) by two pivot members (46) attached thereto. The collar (56) is resilient enough to be securely mounted to the fishing rod (20) and yet flexible enough so that expansion of the collar (56) allows the fishing rod holder (10) to be detached from the fishing rod (20).

FIGS. 6 through 9 depict a third embodiment of this invention. In this embodiment the support member (12) is shaped to conform to the curvature of the handle (26) of the fishing rod (20) when the support member (12) is closed upon the handle (26). The support member (12) additionally has an opening (58) therein for a finger grip (42), which is attached to the fishing rod (20), to pass therethrough when the support member (12) is closed upon the handle (26).

The upper end (16) of the support member (12) is adapted to be pivotally secured to the fishing rod (20) by a collar (56) which is attached to the fishing rod (20). The collar (56) has attached at opposite ends thereof two pivot members (46) upon which the upper end (16) of the support member (12) is attached. The support member (12) may be permanently or removably attached to the pivot members (46).

In use one casts the line of the fishing rod (20) into the surf and then drives the support member (12) into the supporting surface (18), e.g. the sand. One then sets the desired support angle (24) between the fishing rod (20) and support member (12) and sets the variable angle retaining means (22) to retain such angle (24). When a strike occurs, or when it is desired to close and transport the fishing rod (20), the support member (12) is closed upon the handle (26) and the line reeled in. In all these embodiments the fishing rod holder (10) may be removed for separate storage with the fishing rod (20) or, as is preferred in the embodiments depicted in FIGS. 1 through 3 and 6 through 9, the fishing rod holder (10) may be stored with the fishing rod (20).

It is to be understood that the foregoing disclosure relates only to the preferred embodiments of the present invention and that numerous alterations can be used to practice the present invention without departing from the spirit and scope of the invention as defined in the appended claims.

What is claimed:

1. A combination holder and fishing rod comprising:
   (a) a fishing rod and handle therefor;
   (b) a support member of a predetermined length, having a lower end and an upper end, the upper end including a pivotal attachment means for pivotally attaching the holder to the fishing rod a distance from the end of the rod, the distance from the end of the rod being at least equal to the predetermined length, wherein the support member has a finger grip attached thereto and is shaped to conform to the curvature of the handle and wherein a portion of the support member is shaped to conform to an elongated enclosure in the fishing rod; and
   (c) a variable angle retaining means attached to the upper end of the support member for varying and retaining a support angle between the fishing rod and support member, the retaining means having a bearing member projecting at an angle from the upper end of the support member and a variable spacing means attached to the bearing member for varying and retaining the angle and/or spacing between the bearing member and the fishing rod thereby retaining the support angle, whereby the lower end of the support member may be driven into a supporting surface and when desired removed from said surface and the support member may freely pivot and close upon the end of the fishing rod to provide a smoothly contoured handle.

2. The combination of claim 1, wherein the variable spacer means is a threaded member, one end of which is threadably attached to the bearing member and the other end of which can be brought to bear upon a surface of the fishing rod.

3. The combination of claim 1, wherein the upper end of the support member is detachably secured to the fishing rod.

* * * * *